United States Patent [19]

Nieto de Moreno

[11] 4,122,934
[45] Oct. 31, 1978

[54] APPARATUS FOR DECELERATING DESCENDING BODIES

[75] Inventor: Pierre A. Nieto de Moreno, Paris, France

[73] Assignee: Société Soberal S.A., Luxembourg

[21] Appl. No.: 776,186

[22] Filed: Mar. 10, 1977

Related U.S. Application Data

[63] Continuation of Ser. No. 593,495, Jul. 7, 1975, abandoned.

[30] Foreign Application Priority Data

Jul. 23, 1974 [FR] France .............................. 74 25560

[51] Int. Cl.² ............................................ B65G 11/20
[52] U.S. Cl. ........................................ 193/32; 182/48
[58] Field of Search ................. 193/7, 32; 182/48, 49; 187/39

[56] References Cited

U.S. PATENT DOCUMENTS

| 2,647,670 | 8/1953 | Cox | 193/32 |
| 3,464,529 | 9/1969 | Horsky | 193/7 |
| 3,474,886 | 10/1969 | Iordanidis | 187/39 |
| 3,489,258 | 1/1970 | Stokes | 193/32 |

Primary Examiner—Evon C. Blunk
Assistant Examiner—Jeffrey V. Nase
Attorney, Agent, or Firm—Stevens, Davis, Miller & Mosher

[57] ABSTRACT

An apparatus for decelerating descending bodies includes a tubular arrangement vertically disposed or steeply inclined secured at its upper-end to an elevated location. The bodies to be transported are guided down through the tube which retards their movement. Within the wall of the tubular arrangement there is at least one extensible chamber filled with pressurized fluid and having associated with it pressure regulating means, which chamber serves to apply a retarding force to a descending body. The walls of the tubular arrangement are flexible and include a sleeve whereof the wall is non-extensible in the longitudinal and/or axial direction.

4 Claims, 5 Drawing Figures

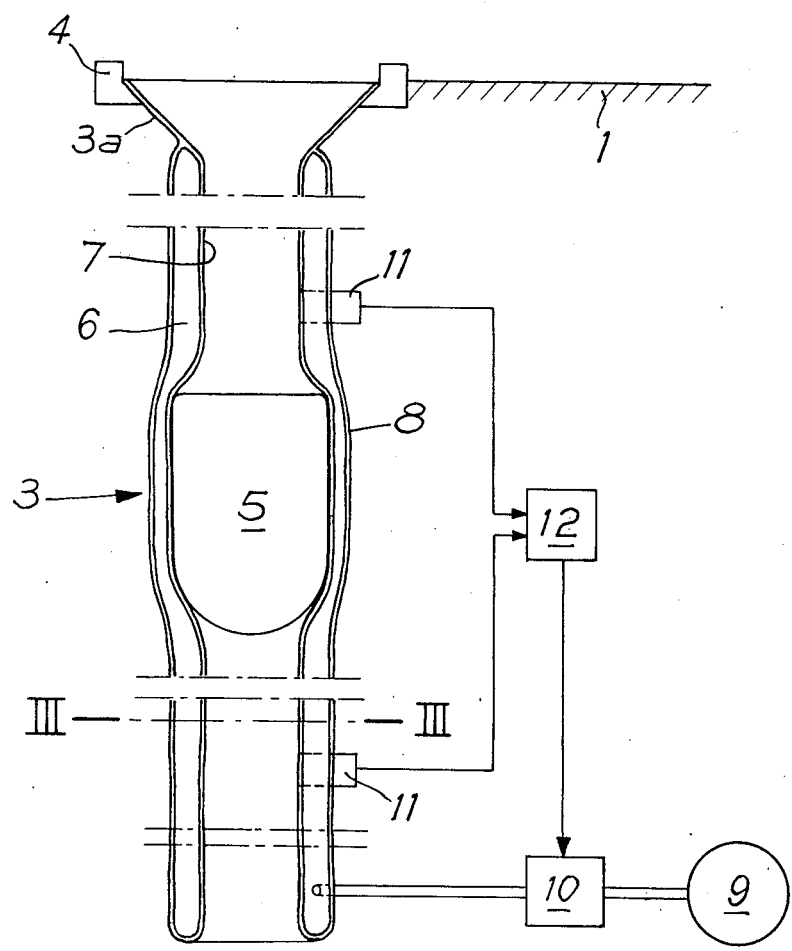
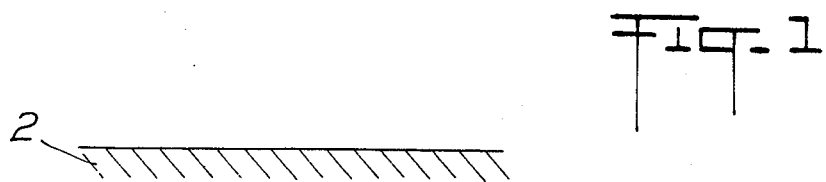
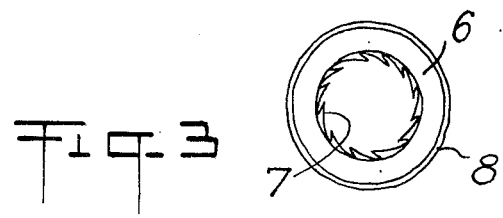

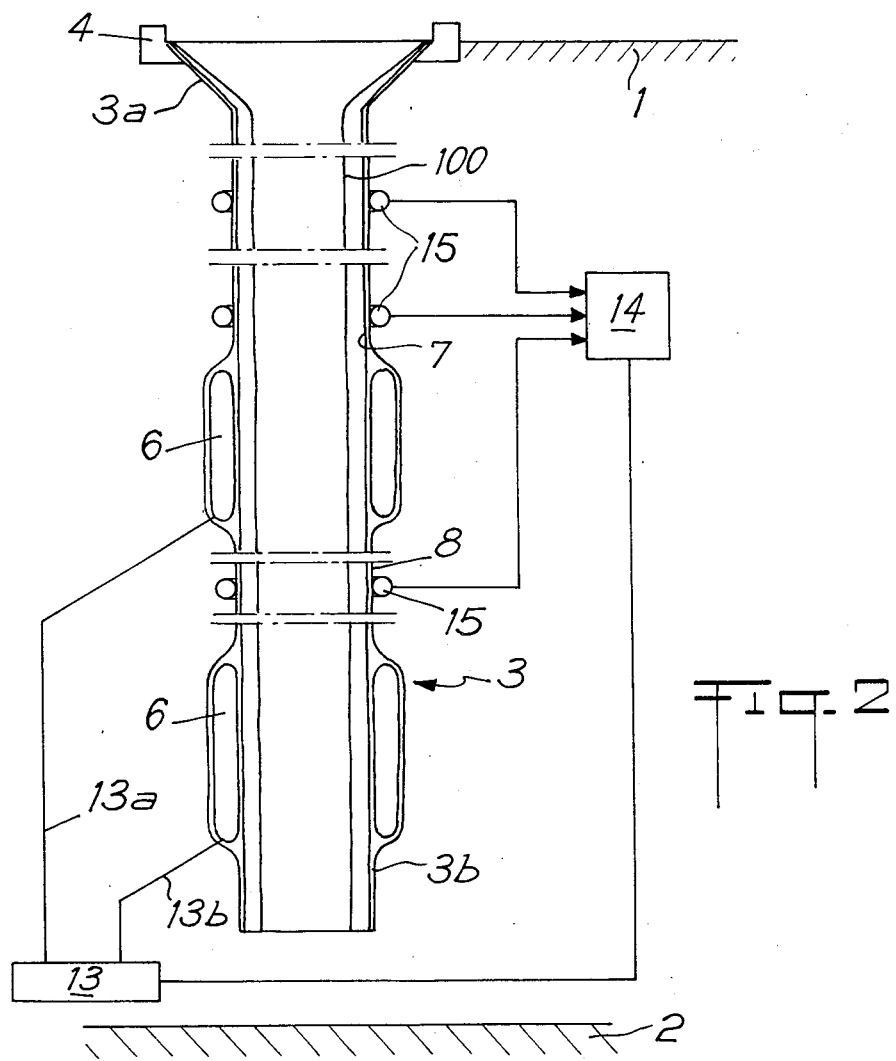
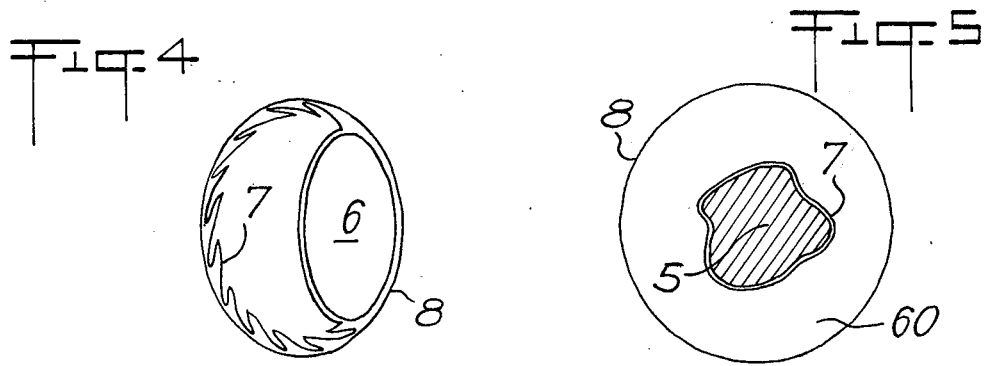

APPARATUS FOR DECELERATING DESCENDING BODIES

This is a continuation of application Ser. No. 593,495 filed July 7, 1975, now abandoned.

The present invention relates to apparatus for decelerating descending bodies, and has particular application to the evacuation of persons in danger or to the evacuation of loads, such persons or loads being located in a building at a high level with respect to the ground, the apparatus comprising at least one tubular arrangement having flexible walls, and being arranged vertically or steeply inclined its upper end secured to the building, the tubular arrangement receiving the bodies to be conveyed, guiding them during their descending movement and retarding the latter during this movement.

Such an apparatus is known in which the tubular arrangement is constituted by a sleeve whereof the wall is resilient in the transverse direction and substantially non-extensible in the longitudinal direction. This known apparatus cannot be used for bodies of different sizes, since if the transverse dimensions of the sleeve of this apparatus are calculated for bodies of a certain size, smaller bodies introduced into this sleeve would be insufficiently retarded, whereas bodies of greater size could not move along this sleeve owing to the excessive magnitude of the braking forces applied by the latter to said bodies.

Furthermore, when this known apparatus is used for evacuating people, it cannot serve to evacuate unconscious people or invalids since due to the inability of the latter to move, they are unable to control their deceleration during movement along the sleeve.

The present invention obviates or mitigates this drawback and its particular object is to provide an apparatus facilitating the evacuation of bodies of very varied size or people who are either invalids or are unconscious.

According to the invention this is achieved by providing in the flexible wall of the tubular arrangement at least one extensible chamber filled with pressurised fluid, and having associated it with means for regulating the pressure of said fluid so that a braking force can be applied to the moving body.

Due to the existence of this extensible chamber, the apparatus may be used for bodies of very varied size since it is sufficient to regulate the pressure prevailing inside the extensible chamber to a value which is suitable and different for each size of body.

Embodiments of the present invention will now be described, by way of example, with reference to the accompanying drawings, in which:

FIG. 1 is a diagrammatic longitudinal vertical section of a first apparatus of the present invention;

FIG. 2 is a diagrammatic longitudinal vertical section of a second apparatus of the invention;

FIG. 3 is a cross-section on line III—III of FIG. 1;

FIG. 4 is a cross-section of the tubular arrangement of a third apparatus; and,

FIG. 5 is a cross-section of the tubular arrangement of a fourth apparatus.

FIGS. 1 to 3 illustrate apparatus for decelerating descending bodies, there bodies being people or loads located in a building at a level 1 elevated with respect to the ground 2. The apparatus comprises a tubular arrangement 3 having flexible walls and which, in the embodiments illustrated, is disposed vertically, and is secured at its upper end 3a to a wall of the building by securing means 4 shown diagrammatically. The upper end 3a of the tubular arrangement 3 is kept open and has a shape which is flared upwards.

The purpose of the tubular arrangement 3 is to receive a body 5 to be conveyed, to guide this descending body 5 and to retard the latter during its downwards movement.

In FIG. 1, the body 5 is illustrated as a rigid receptacle which may contain any object, but this body 5 could alternatively be a person.

According to the invention, in its flexible wall, the tubular arrangement 3 comprises at least one extensible chamber having resilient walls, which is filled with a gas under pressure, such as compressed air, and which is associated with means for regulating the pressure of the gas. The extensible chamber 6 may be of full and elongated shape, as in the embodiment illustrated in FIG. 4, but the embodiments illustrated in FIGS. 1 to 3 show extensible chambers 6 of annular shape. The extensible chamber 6 may even be constituted by the space 60 comprised between the outer sleeve 8 and inner sleeve 7 (see FIG. 5). In this case, these sleeves 8 and 7 are impermeable to the gas under pressure used to fill said inner space 60 and constitute the actual walls of the extensible chamber 6.

According to the embodiment illustrated in FIG. 1, the apparatus comprises only a single extensible chamber 6 of annular shape extending over the entire length of the tubular arrangement 3.

According to the embodiment of FIG. 2, the apparatus comprises two annular extensible chambers 6 located near the lower end 3b of the tubular arrangement 3.

In both cases, the or each extensible chamber is interposed between an inner flexible sleeve 7 which is substantially non-extensible in the longitudinal direction, extending over the entire length of the tubular arrangement 3 and which is pleated in the longitudinal direction (see FIG. 3), and an outer sleeve 8 which is advantageously non-resilient at least in the longitudinal direction.

Advantageously, the inner sleeve 7 is also non-extensible in the transverse direction and has a perimeter equal to the maximum admissible perimeter of the inner surface of the extensible chamber 6. In this case, and when the annular chamber 6 does not cover the entire length of the tubular arrangement 3, (this is the case in FIG. 2) it is necessary that the inner sleeve 7 be resilient in the transverse direction and it is also necessary to dispose inside the sleeve 7, a sleeve 100 which is non-extensible in the transverse and longitudinal directions and is pleated longitudinally as the sleeve 7 illustrated in FIGS. 3 and 4. This inextensible sleeve 100 is intended to receive the falling bodies.

In the case of FIG. 1, the purpose of the extensible chamber 6 is to apply an adjustable retarding force to the falling body 5 by inflating said chamber 5 to a greater or lesser extent from a source of compressd air 9 by a regulating means such as a pressure-reducing valve 10. The inner sleeve 7 is substantially inextensible at least in the longitudinal direction and is pleated as illustrated in FIG. 3.

The outer sleeve 8 fulfils not only the function of protecting the outer wall of the extensible chamber 6, but also the function of a support casing for said chamber 6.

In the case of FIG. 2, it is the purpose of the extensible chambers 6 to apply an additional retarding force to the falling body reaching the lower end of the tubular arrangement 3. In this case, the inner sleeve 7 fulfils the function of a resilient braking sleeve able to apply a force to the falling body 5 to facilitate sufficient braking of same.

The embodiment of FIG. 1 is more particularly suited to the evacuation of paralysed persons, invalids or unconcious persons. In fact, when such people have to be conveyed or evacuated from a high building, a simple apparatus comprising no extensible chamber cannot be used since the deceleration effect achieved would be insufficient. With apparatus according to the invention, such as that which is illustrated in FIG. 1, such people can be conveyed without danger and deposited at a low speed on the ground 2. To this end, the extensible chamber 6 is associated with an automatic inflating device which comprises means for measuring the speed of movement of the falling body. In this case, this means is constituted by at least two detectors 11 which are shown diagrammatically in FIG. 1, and which may be photoelectric cell detectors or pneumatic detectors. The detectors 11 send their information to a calculator 12 which compares the actual measured speed of the falling body with a predetermined speed and signals the regulating valve 10 to increase the inflation of the chamber 6 as soon as this actual speed exceeds the predetermined speed.

The embodiment of FIG. 2 is more particularly suited for use at fairs and for children. In this case, it is necessary to provide additional retarding of the children falling in the tubular arrangement 3 when the latter reach the lower end 3b of said arrangement 3.

To this end, each extensible chamber 6 is associated with automatic inflation means comprising an air pressure distributor 13 receiving control information processed by a calculator 14 which in turn receives information about the actual speed of the falling bodies from pneumatic detectors 15 and which compares these actual speeds with a predetermined speed. The calculator 14 is able to supply the distributor 13 with appropriate inflaton information as soon as one of the actual speeds measured exceeds the predetermined speed. Inflation of the chamber 6 is carried out by means of the conduits 13a, 13b. It is provided that the lower chamber 6 is normally in the inflated state and when the lower dectector 15 signals the passage through this point of the moving body having a suitable speed, this lower chamber 6 is normally deflated on signals received by the distributor 13.

Naturally, various modifications may be applied without departing from the scope of the accompanying claims. For example, the chamber 6 of FIG. 1 could be replaced by a continuous series of adjoining chambers 6.

The invention may be applied to the deceleration of ascending bodies.

What is claimed is:

1. An apparatus for decelerating descending bodies from an elevated location, said apparatus comprising a flexible tubular arrangement extending substantially vertically from said elevated location and secured to a support at said elevated location, said tubular arrangement comprising:

an inner flexible sleeve which is substantially nonextensible in the longitudinal direction, and which extends substantially vertically from said elevated location along the whole length of said flexible tubular arrangement, in order to receive and guide the bodies to be conveyed; and, at least one extensible chamber for filling with a pressurized gas, said chamber defined by a resilient wall distinct from said inner sleeve, said chamber having an annular shape, surrounding the inner sleeve and being associated with means for regulating the pressure of gas in said chamber so as to apply a retarding force to the body moving inside said inner sleeve, the wall of said chamber being flexible.

2. The apparatus according to claim 1, wherein the inner sleeve is pleated longitudinally.

3. The apparatus according to claim 1, wherein said means for regulating the pressure of gas in said extensible chamber comprises means for measuring the speed of movement of the falling body and which is adapted to connect said extensible chamber to at least one source of gas under pressure as soon as said speed of movement exceeds a predetermined value.

4. The apparatus according to claim 1, comprising several extensible chambers arranged one after the other along the inner sleeve.

* * * * *